United States Patent
Hsu

(10) Patent No.: US 8,569,984 B2
(45) Date of Patent: Oct. 29, 2013

(54) MOTOR CONTROLLER

(75) Inventor: Chi-Lin Hsu, New Taipei (TW)

(73) Assignee: Princeton Technology Corporation, New Taipei (TW)

( * ) Notice: Subject to any disclaimer, the term of this patent is extended or adjusted under 35 U.S.C. 154(b) by 265 days.

(21) Appl. No.: 13/271,596

(22) Filed: Oct. 12, 2011

(65) Prior Publication Data

US 2012/0091936 A1 Apr. 19, 2012

(30) Foreign Application Priority Data

Oct. 13, 2010 (TW) ................................ 99134853 A

(51) Int. Cl.
*G05D 23/20* (2006.01)
*H02K 29/08* (2006.01)

(52) U.S. Cl.
CPC ...................................... *H02K 29/08* (2013.01)
USPC ............ 318/400.38; 318/400.37; 318/400.01; 318/700; 318/472

(58) Field of Classification Search
CPC ..................................................... H02K 29/08
USPC ................... 318/400.38, 400.37, 400.01, 700
See application file for complete search history.

(56) References Cited

U.S. PATENT DOCUMENTS 7,659,678 B2 * 2/2010 Maiocchi ................. 318/400.22

* cited by examiner

*Primary Examiner* — Bentsu Ro
*Assistant Examiner* — David Luo
(74) *Attorney, Agent, or Firm* — Muncy, Geissler, Olds & Lowe, PLLC

(57) ABSTRACT

A motor controller controlling a rotational speed of a motor and including a thermal detector, a capacitor, an operational amplifier (OP), a charging/discharging circuit, a flip-flop and a logic circuit. The thermal detector detects environmental temperature of the motor to set a first reference voltage. The capacitor has one terminal coupled to a second reference voltage while another terminal thereof is charged/discharged by the charging/discharging circuit, controlled by a pulse width modulation (PWM) signal, to provide a third reference voltage. The OP compares the first and third reference voltages and outputs the comparison result to a 'set' terminal of the flip-flop. The flip-flop further uses a 'reset' terminal to receive a clock signal and the output signal thereof is utilized in generating the PWM signal. The PWM signal is further provided to the logic circuit for setting a duty cycle of a driving current of the motor.

10 Claims, 5 Drawing Sheets

US 8,569,984 B2

MOTOR CONTROLLER

CROSS REFERENCE TO RELATED APPLICATIONS

This Application claims priority of Taiwan Patent Application No. 099134853, filed on Oct. 13, 2010, the entirety of which is incorporated by reference herein..

BACKGROUND OF THE INVENTION

1. Field of the Invention

The present invention relates to motor controllers, and in particular relates to motor control techniques controlling a radiator fan.

2. Description of the Related Art

With the shrinking size of electronic components, an increased quantity of electronic components may be contained in an electronic device generating considerable thermal energy. Thus, heat dissipation is an important issue in the design of electronic devices. Using a radiator fan is a well-known solution.

Generally, a radiator fan is driven by a motor, and the rotational speed of the radiator fan depends on a driving current of the motor. To save energy, the rotational speed of the radiator fan may be adjusted according to the environmental temperature. The technique of using a proper driving current to rotate a radiator fan according to the environmental temperature to dissipate heat has been a significant topic in the field.

BRIEF SUMMARY OF THE INVENTION

Motor controllers are disclosed to control a rotational speed of a motor. The motor may be utilized to rotate a radiator fan.

A motor controller in accordance with an exemplary embodiment of the invention comprises a thermal detector, a first capacitor, a first operational amplifier, a charging/discharging circuit, a flip-flop and a logic circuit. The thermal detector detects environmental temperature to dynamically determine a first reference voltage. The first capacitor has a first terminal coupled to a second reference voltage and has a second terminal coupled to the first operational amplifier to provide the first operational amplifier with a third reference voltage. The charging/discharging circuit charges/discharges the first capacitor based on a pulse width modulation signal, such that that the third reference voltage vibrates accordingly. The first operational amplifier compares the third reference voltage with the first reference voltage and outputs a comparison result to a set terminal of the flip-flop. A reset terminal of the flip-flop receives a clock signal and a signal at an output terminal of the flip-flop is utilized in the generation of the pulse width modulation signal. In addition to controlling the charging/discharging circuit, the pulse width modulation signal is utilized by the logic circuit to determine a duty cycle of a driving current of the motor, to thereby determine the rotational speed of the motor.

In the application of a radiator fan, the disclosed motor controller allows the radiator fan to adjust the rotational speed thereof according to the environmental temperature, so as to optimize power efficiency.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several embodiments carrying out the invention. This description is made for the purpose of illustrating the general principles of the invention and should not be taken in a limiting sense. The scope of the invention is best determined by reference to the appended claims.

Figure 1:
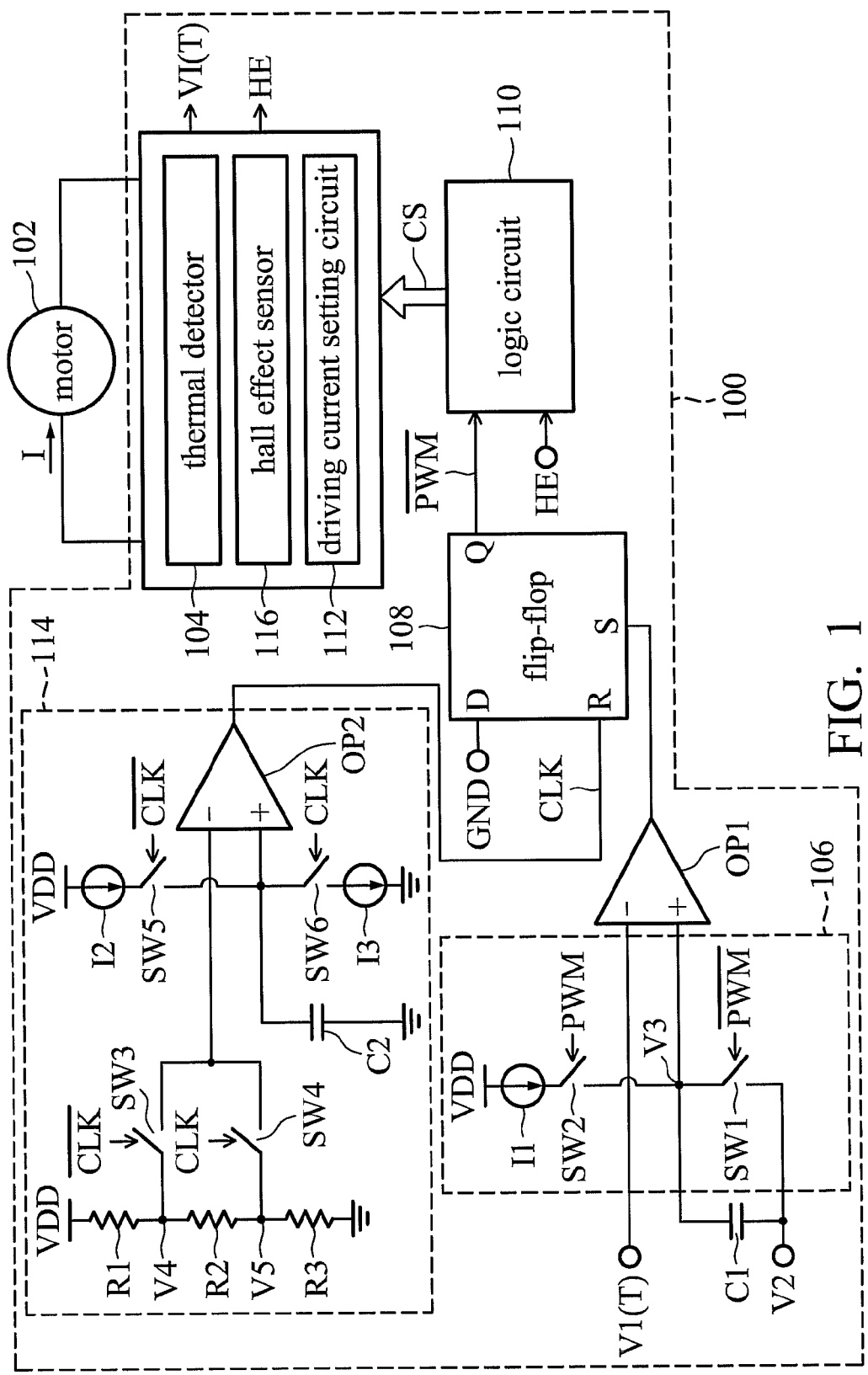
FIG. 1 depicts a motor controller according to an exemplary embodiment of the invention.

FIG. 1 depicts a motor controller 100 in accordance with an exemplary embodiment of the invention. The motor controller 100 controls a rotational speed of a motor 102.

The elementary structure of the motor controller 100 includes a thermal detector 104, a first capacitor C1, a first operational amplifier OP1, a charging/discharging circuit 106, a flip-flop 108 and a logic circuit 110. The thermal detector 104 detects the environmental temperature of the motor 102, to dynamically determine the value of a first reference voltage V1(T), where the parameter T represents the environmental temperature, and, the thermal detector 104 may be a thermistor or any electronic device operating according to the environmental temperature.

The first reference voltage V1(T) is coupled to the first operational amplifier OP1; for example, the first reference voltage V1(T) may be coupled to an inverting input terminal (labeled '-') of the first operational amplifier OP1. The first capacitor C1 has one terminal coupled to a second reference voltage V2, and has another terminal coupled to the charging/discharging circuit 106, controlled by a pulse width modulation signal PWM, to provide a third reference voltage V3. The charging/discharging circuit 106 charges/discharges the first capacitor C1 and thereby the third reference voltage V3 vibrates accordingly. The third reference voltage V3 is coupled to the first operational amplifier OP1; for example, the third reference voltage V3 is coupled to a non-inverting input terminal (labeled '+') of the first operational amplifier OP1. By the first operational amplifier OP1, the vibrating third reference voltage V3 is compared with the temperature-dependent first reference voltage V1(T), and the compassion result is outputted to a set terminal of the flip-flop 108 (e.g. a terminal 'S' of an SR flip-flop). The flip-flop 108 further has a reset terminal (e.g. a terminal 'R' of an SR flip-flop) receiving a clock signal CLK and has an output terminal (e.g. a terminal 'Q' of an SR flip-flop).

In the embodiment of FIG. 1, the signal at the output terminal 'Q' of the flip-flop 108 is labeled '$\overline{PWM}$' to represent the inverted signal of the pulse width modulation signal PWM. The output terminal 'Q' of the flip-flop 108 is coupled to the charging/discharging circuit 106 to control the charging/discharging of the first capacitor C1. Furthermore, the output terminal 'Q' of the flip-flop 108 is coupled to the logic circuit 110. The logic circuit 110 determines a duty cycle of a driving current I of the motor 102 based on the pulse width modulation signal PWM. Referring to the embodiment of FIG. 1, the logic circuit 110 outputs control signals CS to control a driving current setting circuit 112 coupled to the motor 102. In this manner, the duty cycle of the driving current I of the motor 102 depends on the duty cycle of the pulse width modulation signal PWM.

Because the rotational speed of the motor 102 is dependent on the duty cycle of the driving current I thereof, the disclosed elementary structure of the motor controller controls the rotational speed of the motor 102 according to the environmental temperature. In a high temperature environment, the radiator fan rotated by the motor 102 rotates at a higher speed in comparison with a low temperature environment. The power efficiency is optimized.

The embodiment of FIG. 1 further shows the charging/discharging circuit 106 in detail. As shown, the charging/discharging circuit 106 comprises a first current source I1, a first switch SW1 and a second switch SW2. The first current source I1 provides a first current (labeled I1' as well). The first switch SW1 is turned on when the pulse width modulation signal PW is disabled (i.e. to be controlled by the inverted pulse width modulation signal '$\overline{PWM}$'), to short the two terminals of the first capacitor C1. The second switch SW2 is turned on when the pulse width modulation signal PWM is enabled, to charge the first capacitor C1 by the first current I1.

Figure 2:
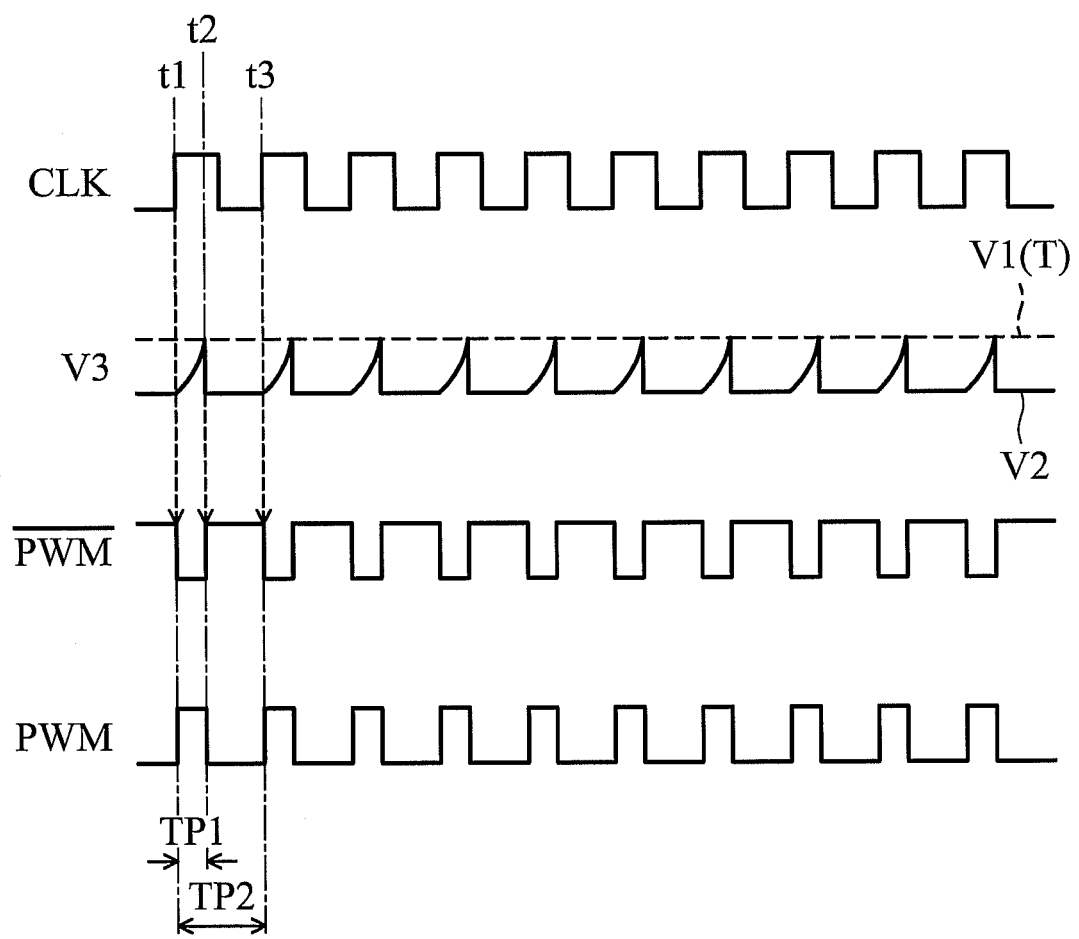
FIG. 2 shows waveforms of several signals of FIG. 1, for discussion of the operation of the disclosed motor controller.

FIG. 2 illustrates waveforms of several signals of FIG. 1, to show the operations of the disclosed structure. In FIG. 2, there are waveforms of the clock signal CLK, the third reference voltage V3, the inverted pulse width modulation signal '$\overline{PWM}$' and the pulse width modulation signal PWM. In this embodiment, the environmental temperature is stable, such that the first reference voltage V1(T) is kept at a constant value. The initial value of the third reference voltage V3 equals to the second reference voltage V2.

The following discussion, references the time indexes t1, t2 and t3. At the time index t1, the clock signal CLK is enabled. The reset terminal a' of the flip-flop 108 detects the enabling of the clock signal CLK and thereby resets the signal '$\overline{PWM}$' at the output terminal 'Q' to low to raise the pulse width modulation signal PWM to high. Controlled by the low '$\overline{PWM}$' and the high PWM, respectively, the first switch SW1 is turned off and the second switch SW2 is turned on. The first current I1 charges the first capacitor C1 and the third reference voltage V3 is raised accordingly. At the time index t2, the first operational amplifier OP1 detects that the third reference voltage V3 has overshot the first reference voltage V1(T) and thereby outputs a high level signal to the set terminal 'S' of the flip-flop 108. The flip-flop 108 immediately sets the signal '$\overline{PWM}$' at the output terminal 'Q' to high.

The pulse width modulation signal PWM is switched to low accordingly. Controlled by the high '$\overline{PWM}$' and the low PWM, the first switch SW1 is turned on and the second switch SW2 is turned off and so that the third reference voltage V3 is pulled back to the second reference voltage V2. At the time index t3, the clock signal CLK is switched to high again. The reset terminal 'R' of the flip-flop 108 detects the low-to-high change of the clock signal CLK and resets the signal '$\overline{PWM}$' at the output terminal 'Q' to low. The pulse width modulation signal PWM is switched to high accordingly.

To summarize, the enable cycle TP1 of the pulse width modulation signal PWM depends on a time interval required to raise the third reference voltage V3 to the first reference voltage V1(T). In other words, the temperature-dependent first reference voltage V1(T) determines the duty cycle TP1/TP2 of the pulse width modulation signal PWM and thereby determines the rotational speed of the motor 102. For example, the first reference voltage V1(T) may be a positive coefficient of the environment temperature. The higher the environmental temperature is, the greater the first reference voltage V1(T) is, and the longer the time interval is required to raise the third reference voltage V3 to the first reference voltage V1(T). In this manner, the enable cycle TP1 of the pulse width modulation signal PWM is increased so that the motor 102 is sped up and the rotational speed of the radiator fan is increased. On the contrary, the lower the environmental temperature is, the lower the first reference voltage V1(T) is and the shorter the time interval is required to raise the third reference voltage V3 to the first reference voltage V1(T). In this manner, the enable cycle TP1 of the pulse width modulation signal PWM is decreased, so that the motor 102 slows down and the rotational speed of the radiator fan is decreased. Therefore, the rotational speed of the radiator fan is adjusted according to the environmental temperature. The power efficiency is optimized.

In the following paragraphs, another adjustable parameter—the cycle period, TP2, of the pulse width modulation signal PWM—is discussed to control the duty cycle TP1/TP2 of the pulse width modulation signal PWM. The cycle period TP2 of the pulse width modulation signal PWM is dependent on the cycle period of the clock signal CLK. To control the length of the cycle period TP2 of the pulse width modulation signal PWM, a clock signal generating circuit is introduced.

Referring to FIG. 1, a clock signal generating circuit 114 is introduced in the motor controller 100. The clock signal generating circuit 114 includes a second operational amplifier OP2, a first resistor R1, a second resistor R2, a third resistor R3, a third switch SW3, a fourth switch SW4, a second capacitor C2, a second current source I2, a third current source I3, a fifth switch SW5 and a sixth switch SW6. The first, second and third resistors R1, R2 and R3 are sequentially coupled, in series, between a voltage source VDD and a ground as a voltage divider. The connection node between the first and second resistors R1 and R2 provides a fourth reference voltage V4. A connection node between the second and third resistors R2 and R3 provides a fifth reference voltage V5. By controlling the third and the fourth switches SW3 and SW4, the fourth or the fifth reference voltage V4 or V5 is selected to be coupled to an inverting terminal (labeled '-') of the second operational amplifier OP2. The non-inverting input terminal (labeled '+') of the second operational amplifier OP2 is coupled to the second capacitor C2. The second current source I2 is operative to generate a second current (labeled I2' as well) to be conducted to the second capacitor C2 by the fifth switch SW5 for charging the second capacitor C2.

The third current source I3 is operative to generate a third current (labeled "I3' as well) to be coupled to the second capacitor C2 by the sixth switch SW6 for discharging the second capacitor C2. The second operational amplifier OP2 compares the voltage levels at the non-inverting terminal '-' and the inverting terminal '+' thereof, to output the clock signal CLK to the flip-flop 108. To oscillate the clock signal CLK, the third, fourth, fifth and sixth switches SW3, SW4, SW5 and SW6 are controlled by the feedback of the clock signal CLK. The third and fifth switches SW3 and SW5 are turned on when the clock signal CLK is disabled (i.e., controlled by the inverted clock signal '$\overline{CLK}$'), and the fourth and sixth switches SW4 and SW6 are turned on when the clock signal CLK is enabled (i.e., controlled by the clock signal CLK).

According to the design of the clock signal generating circuit 114, the oscillation period TCLK of the generated clock signal CLK is:

$$TCLK = \frac{C2 \cdot VDD \cdot \frac{R2}{R1+R2+R3}}{I2 // I3}.$$

Because the cycle period TP2 of the pulse width modulation signal PWM approximates the oscillation period TCLK of the clock signal CLK (i.e. TP2≅TCLK), the length of the cycle period TP2 of the pulse width modulation signal PWM may be determined by properly designing the components—including C2, R1~R3, I2 and I3—of the clock signal generating circuit 114. In this manner, the duty cycle TP1/TP2 of the pulse width modulation signal PWM can be determined and thereby the rotational speed of the motor 102 can be determined.

In some embodiments, the first and second capacitors C1 and C2 have identical capacitances (C1=C2), the sum of the resistance of the first and third resistors R1 and R3 equals to the resistance of the second resistor R2 (for example, R1=R3=0.5R2 so that R1+R3=R2), and the second and third currents I2 and I3 are identical (I2=I3). The calculation for the time interval TP1 required to charge the third reference voltage V3 from the second reference voltage V2 to the first reference voltage T1(T) is:

$$TP1 = \frac{C1}{I1}(V1(T) - V2)$$

and the calculation for the duty cycle TP1/TP2 of the pulse width modulation signal PWM is:

$$\frac{TP1}{TP2} = \frac{C1}{C2} \times \frac{I2 // I3}{I1} \times \frac{V1(T) - V2}{VDD} \times \frac{R1+R2+R3}{R2}$$

Because, C1=C2, R1+R3=R2 and I2=I3, the calculation of the duty cycle TP1/TP2 of the pulse width modulation signal PWM may be simplified as:

$$\frac{TP1}{TP2} = \frac{I2}{I1} \times \frac{V1(T) - V2}{VDD}. \qquad \text{Equation (1)}$$

The relationship between the duty cycle TP1/TP2 and the first reference voltage V1(T) depends on the design of the first current source I1, the second current source I2 and the second reference voltage V2; thus, the relationship between the rotational speed of the motor and the variation of the environmental temperature may be determined.

Figure 3:
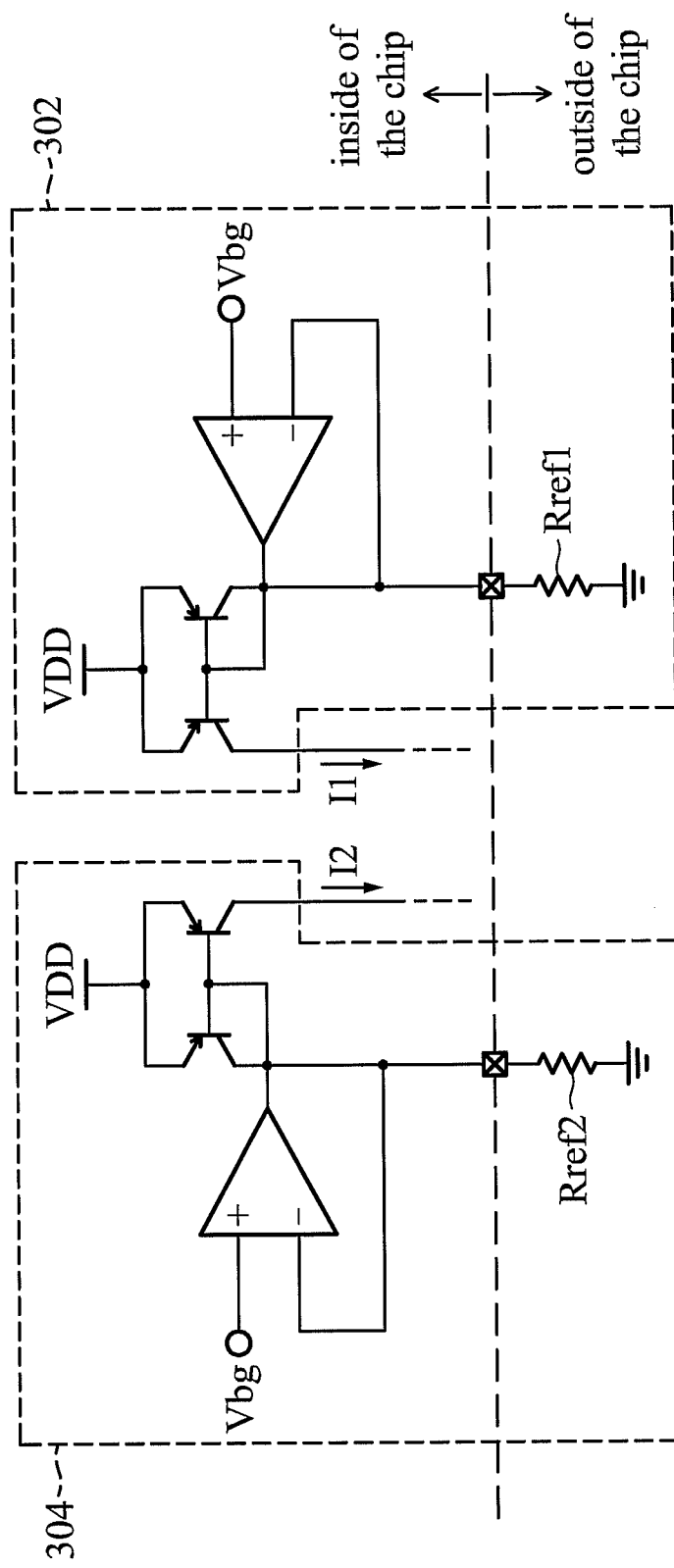
FIG. 3 depicts an exemplary embodiment of the first and the second current sources I1 and I2.

FIG. 3 depicts an exemplary embodiment of providing the first and the second currents I1 and I2. As shown, there is a first current source 302 and a second current source 304 generating the first current I1 and the second current I2, respectively. The first current source 302 contains a first reference resistor Rref1 and the second current source 304 contains a second reference resistor Rref2. In this embodiment, the first current I1 and the second current I2 are:

$$I1 = \frac{Vbg}{Rref1} \text{ and } I2 = \frac{Vbg}{Rref2},$$

respectively, where Vbp represents a bandgap reference voltage. The resistance of the first and second reference resistors Rref1 and Rref2 are designed by the user and may be deployed outside of the chip so that they may be conveniently replaced by resistors of other resistances.

Combined with the design of FIG. 3—I1=Vbg/Rref1 and I2=Vbg/Rref2—equation (1) may be simplified as:

$$\frac{TP1}{TP2} = \frac{Rref1}{Rref2} \times \frac{V1(T) - V2}{VDD}.$$

Figure 4:
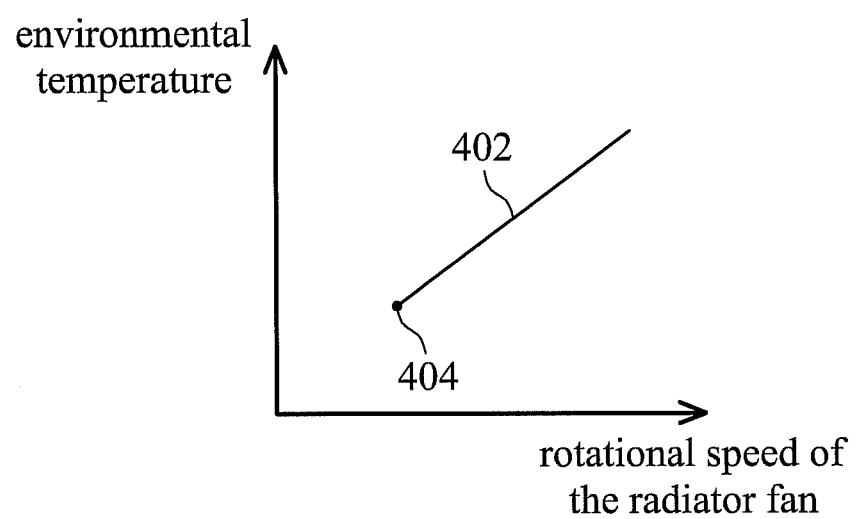
FIG. 4 relates to a radiator fan using the disclosed technique, wherein a relationship between a rotational speed of the radiator fan and the environmental temperature is illustrated.

In the application of a radiator fan, the duty cycle TP1/TP2 of the pulse width modulation signal PWM determines the rotational speed of the radiator fan and the first reference voltage V1(T) is dependent on the environmental temperature. The relationship between the environmental temperature and the rotational speed of the radiator fan may be shown as the curve 402 of FIG. 4. The lowest value 404 of the curve 402 is dependent on the value of the second reference voltage V2. The slope of the curve 402 is dependent on the ratio Rref1/Rref2.

Referring back to FIG. 1, the motor 102 controlled by the disclosed motor controller 100 may be a brushless DC motor. In such cases, the motor controller may further comprise a hall effect sensor 116 which senses the hall effect HE of the motor 102. In the embodiment shown in FIG. 1, the logic circuit 110 may further take the hall effect HE sensed by the hall effect sensor 116 into consideration when generating the control signals CS and the generated control signals CS may further control the driving current setting circuit 112 to set the direction of the driving current I of the motor 102.

Figure 5:
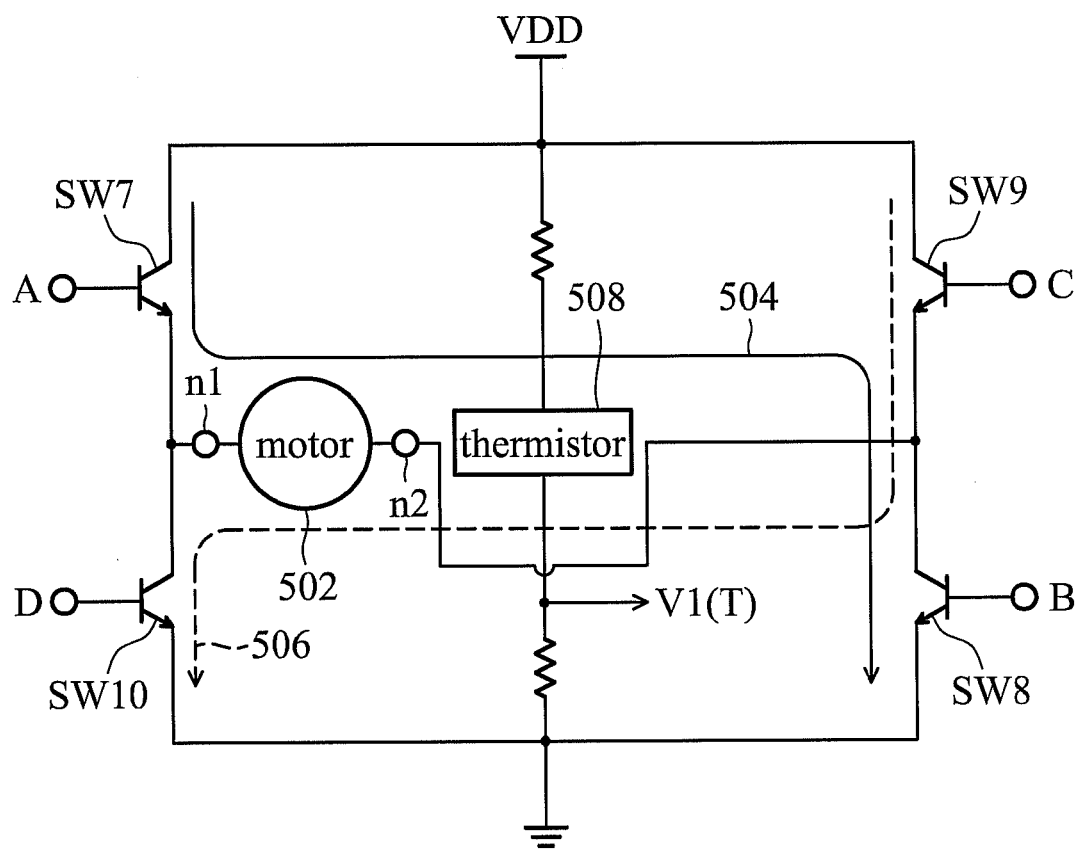
FIG. 5 depicts connections between a brushless DC motor, a driving current setting circuit and a thermal detector.

FIG. 5 depicts the connections between a brushless DC motor, a driving current setting circuit and a thermal detector in accordance with one exemplary embodiment of the invention. As shown, one thermsitor 508 and two resistors are coupled in series between a voltage source VDD and a ground and the thermistor 508 is deployed nearby the motor 502 to play the role of a thermal detector. The resistance of the thermistor 508 is dependent on the environmental temperature and a temperature-dependent first reference voltage V1(T) is generated accordingly. In FIG. 5, a driving current setting circuit includes a seventh switch SW7, a eighth switch SW8, a ninth switch SW9 and a tenth switch SW10 which are controlled by control signals A, B, C and D, respectively. The control signals A~D are collectively labeled as 'CS' in FIG. 1. When the seventh switch SW7 is turned on, a first terminal n1 of the motor 502 is coupled to the voltage source VDD. When the eighth switch SW8 is turned on, a second terminal n2 of the motor 502 coupled to the ground. The conduction provided by the turned-on seventh and eighth switches SW7 and SW8 allow the driving current of the motor 502 to flow in a first direction 504. When the ninth switch SW9 is turned on, the second terminal n2 of the motor 502 is coupled to the voltage source VDD. When the tenth switch SW10 is turned on, the first terminal n1 of the motor 502 is coupled to the ground. The conduction provided by the turned-on ninth and tenth switches SW9 and SW10 allow the driving current of the motor 502 to flow in a second direction 506. The driving current of the motor 502 is switched between the first direction 504 and the second direction 506.

This paragraph discusses the operations of the driving current setting circuit formed by the switches SW7~SW10. If the hall effect sensed by the hall effect sensor shows that the driving current should flow in the first direction 504, then, the seventh and the eighth switches SW7 and SW8 should be turned on/off according to the enabling/disabling of the pulse width modulation signal PWM. On the contrary, if the hall effect sensed by the hall effect sensor shows that the driving current should flow in the second direction 506, then, the ninth and the tenth switches SW9 and SW10 should be turned on/off according to the enabling/disabling of the pulse width modulation signal PWM. In this manner, the rotational speed of the radiator fan controlled by the motor 502 is adjusted according to the environmental temperature. The logic controlling the switches SW7~SW10 are provided by the logic circuit 110 shown in FIG. 1.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motor controller controlling a motor, comprising
    a thermal detector for detecting environmental temperature around the motor to dynamically determine a first reference voltage based on the detected environmental temperature;
    a first capacitor having a first terminal and a second terminal, wherein the first terminal is coupled to a second reference voltage;
    a first operational amplifier coupled to the second terminal of the first capacitor to receive a third reference voltage and compare the third reference voltage with the first reference voltage;
    a charging/discharging circuit charging/discharging the first capacitor based on a pulse width modulation (PWM) signal to change the third reference voltage;
    a flip-flop having a set terminal receiving a signal at an output terminal of the first operational amplifier, a reset terminal receiving a clock signal, and an output terminal coupled to the charging/discharging circuit to provide the charging/discharging circuit with the PWM signal; and
    a logic circuit coupled to the output terminal of the flip-flop to determine a duty cycle of a driving current of the motor based on the PWM signal.

2. The motor controller as claimed in claim 1, wherein:
    the first reference voltage is coupled to an inverting input terminal of the first operational amplifier;
    the third reference voltage is coupled to an non-inverting input terminal of the first operational amplifier; and
    a signal at the output terminal of the flip-flop is regarded as the inverted signal of the PWM signal.

3. The motor controller as claimed in claim 2, wherein the charging/discharging circuit comprises:
    a first current source for providing a first current;
    a first switch coupled between the first terminal and the second terminal of the first capacitor, which is turned on when the PWM signal is disabled; and
    a second switch coupled between the first current source and the first switch, which is turned on when the PWM signal is enabled to conduct the first current to charge the first capacitor.

4. The motor controller as claimed in claim 1, further comprising a clock signal generating circuit, wherein the clock signal generating circuit comprises:
    a second operational amplifier having a non-inverting input terminal, an inverting input terminal and an output terminal outputting the clock signal;
    a resistor series having a first resistor, a second resistor and a third resistor sequentially coupled between a voltage source and a ground, wherein a connection node between the first and second resistors provides a fourth reference voltage, and a connection node between the second and the third resistors provides a fifth reference voltage;
    a third switch turned on when the clock signal is disabled and coupled to the fourth reference voltage to the inverting input terminal of the second operational amplifier;
    a fourth switch turned on when the clock signal is enabled and coupled to the fifth reference voltage to the inverting input terminal of the second operational amplifier;
    a second capacitor coupled to the non-inverting input terminal of the second operational amplifier;
    a second current source and a third current source for providing a second current and a third current, respectively;
    a fifth switch turned on when the clock signal is disabled to conduct the second capacitor charge through the second current; and
    a sixth switch turned on when the clock signal is enabled to conduct the second capacitor discharges through the third current.

5. The motor controller as claimed in claim 4, wherein:
    the first capacitor and the second capacitor have identical capacitance;
    the resistance of the first resistor and the third resistor equals to the resistance of the second resistor; and
    the second current equals to the third current.

6. The motor controller as claimed in claim 4, wherein:
    the first current source includes a first reference resistor and generates the first current based on the resistance of the first reference resistor; and
    the second current source includes a second reference resistor and generates the second current based on the resistance of the second reference resistor.

7. The motor controller as claimed in claim 6, wherein the first reference resistor and the second reference resistor are disposed outside of a chip form consisting essentially of the motor controller for convenient replacement.

8. The motor controller as claimed in claim 1, further comprising:
    a hall effect sensor for sensing a status of the motor to determine a flow direction of the driving current of the motor.

9. The motor controller as claimed in claim 1, further comprising a driving current setting circuit, wherein the driving current setting circuit comprises:
    a seventh switch coupled between a first terminal of the motor and a voltage source;
    an eighth switch coupled between a second terminal of the motor and a ground;
    a ninth switch coupled between the second terminal of the motor and the voltage source; and
    a tenth switch coupled between the first terminal of the motor and the ground, wherein the driving current of the motor flows in a first direction when the seventh and the eighth switches are turned on, and wherein the driving current of the motor flows in a second direction when the ninth and the tenth switches are turned on.

10. The motor controller as claimed in claim 9,

Wherein the PWM signal is provided so that turn on the seventh and the eighth switches when a sensed result of a hall effect sensor shows that the driving current of the motor flows through the first direction; and Wherein the PWM signal is provided so that turning on the ninth and the tenth switches when the sensed result of the hall effect sensor shows that the driving current of the motor should flows through the second direction.

\* \* \* \* \*